2 Sheets. Sheet 1.

A. D. Shattuck,
Carding Machine.

No 434. Reissued Mar. 10, 1857.

A. D. Shattuck,
Carding Machine.

Reissued Mar. 10, 1857.

No. 434.

UNITED STATES PATENT OFFICE.

A. D. SHATTUCK, OF GRAFTON, MASSACHUSETTS

IMPROVEMENT IN CARDING-ENGINES.

Specification forming part of Letters Patent No. 15,781, dated September 23, 1856; Reissue No. 434, dated March 10, 1857.

*To all whom it may concern:*

Be it known that I, A. D. SHATTUCK, of Grafton, in the county of Worcester and State of Massachusetts, have invented certain Improvements in Carding-Engines, of which the following is a full, clear, and exact description, reference being had to the annexed drawings, making part of this specification, in which—

Figure 1:
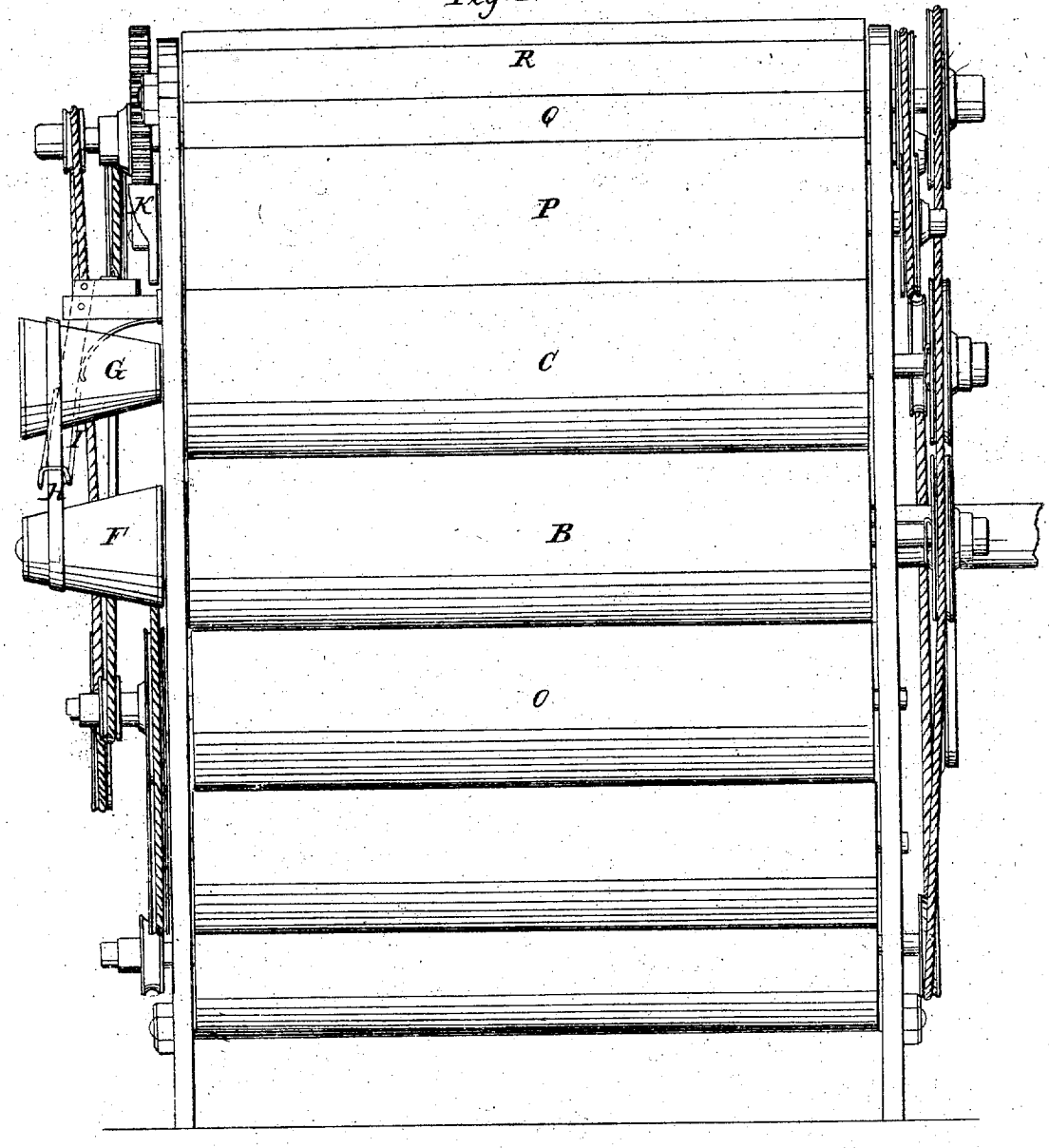
Figure 2:
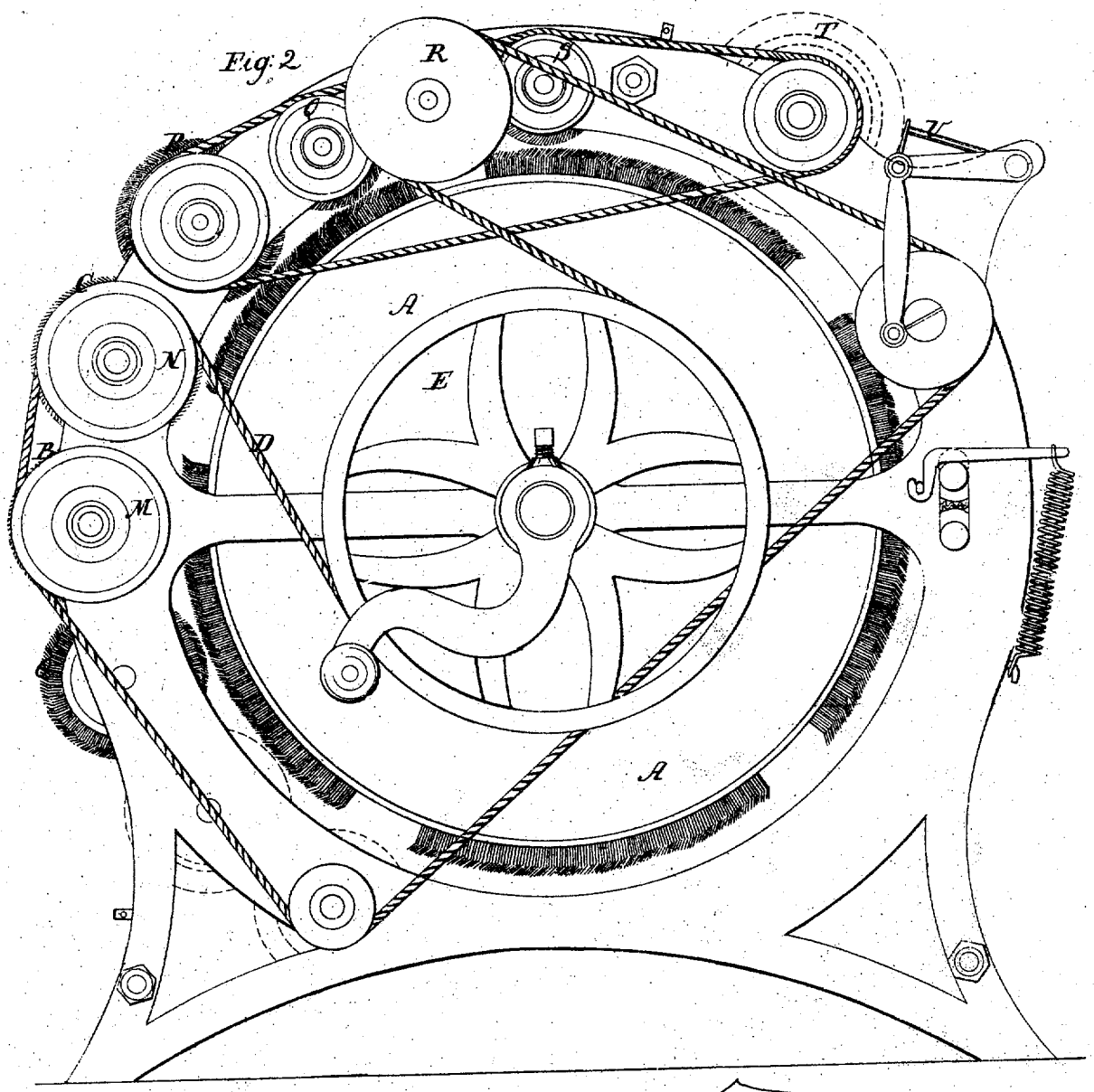
Figure 3:
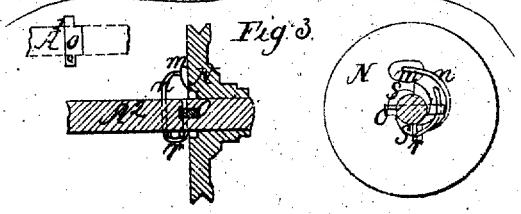

Figure 1 is a front view; Fig. 2, an end view; Fig. 3, details which will be referred to hereinafter.

I will here give a few definitions necessary to a proper understanding of the subject.

The small cylinders of carding-engines which operate in conjunction with the main cylinder are called "workers," "doffers," or "strippers," according to the nature of their operation with respect to each other or upon the main cylinder. Workers and doffers receive, and strippers take, the cotton from the cylinders.

A worker first runs slower than its cylinder; second, its teeth are set against the cylinder-teeth; third, it is cleaned of its cotton by a stripper, from which the cotton is taken again by the cylinder.

A doffer first runs slower than its cylinder; second, its teeth are set against the cylinder-teeth; third, it is cleaned of its cotton by a comb or by a stripper.

A stripper first runs faster than its cylinder; second, its teeth are set with the cylinder-teeth; third, it may be cleaned of its cotton by another stripper, or by a doffer, or by a cylinder.

The above terms are used with sole reference to the action of the cylinders for the time being, or to their action upon the particular cylinder with which they are running in connection, the same cylinder being at the same time of one character as respects its action upon another cylinder, and of another character as respects its action upon a third cylinder. Thus a main cylinder may at the same time be a stripper when it takes its cotton from a doffer, a stripper, or a licker-in. A licker-in, without losing its character as such, may at the same time be both a stripper to a worker and a doffer to a stripper to the main cylinder; or a stripper to the main cylinder may be at the same time a licker-in, giving its cotton to a doffer which is stripped by the main cylinder; or the main cylinder may become a doffer and receive cotton from a stripper that has operated upon any other cylinder of the card.

In carding-engines as ordinarily constructed and operated the main cylinder is cleared or stripped by hand at intervals, the card being stopped at the time for the purpose. Upon every such occasion, and after each stripping, the operation of the card is modified and a variation in the sheet is the consequence. This variation or unevenness of the sheet runs through the whole subsequent preparation of the cotton, and is even felt to a certain extent in the thread which is ultimately produced.

Efforts have been made to do away with the necessity of hand stripping to avoid the objections to which this method is liable by the employment of a stripper-cylinder which alternately runs faster and slower than the main cylinder, so that the stripper alternately strips the main cylinder and in turn is stripped thereby as the relative velocity of the two change. It is evident, however, that a card thus constructed and operated cannot produce an even and uniform sheet, as at one time the stripper is taking cotton off the main cylinder and at another is returning it thereto.

The object of the first part of my invention is to remedy in a degree this disadvantage by the use of two stripping-cylinders, which are caused to run with a variable speed alternately faster and slower than the other, and at a velocity alternately above and below that of the main cylinder. By this arrangement one or other of them is constantly stripping the main cylinder while the other is being stripped by the main cylinder, as may be seen by reference to the accompanying drawings, in which—

A is the main cylinder, and B and C the two variable cylinders, which, when taken out of their connection with the doffer P and worker O, show one operation of this improvement, which will be hereinafter more fully set forth. The cylinders B and C may be placed upon the card in positions remote from each other, and the result specified will still be attained.

The second part of my invention effectually obviates the above-named objection, and consists in the use of a doffer in connection with one or more stripping-cylinders, whereby an uninterrupted and continuous movement of the cotton or other fiber is attained in its progress through the card, which secures uniformity in the sheet.

When a single stripper is employed, whether it run at a constant or variable speed, the doffer is used running at a constant speed, and is stripped by the main cylinder. Where two strippers are employed, they may be caused to run with a variable speed alternately faster and slower than the other, and at a velocity alternately above and below that of the main cylinder, and thus one or other of them is constantly stripping the main cylinder, while the cotton taken off is instantly returned to the main cylinder either by the doffer or by that one of the strippers which at the time may be running slower than the cylinder and acting as a doffer to the other stripper, as seen by reference to the accompanying drawings; or a stripper to the main cylinder may be stripped by another cylinder which shall take the fiber to the main cylinder, the main cylinder acting as a doffer.

The third part of my invention has reference to the position of the stripper with respect to its worker, and consists in placing it in advance of the worker instead of behind it, as has heretofore been practiced. Where the stripper is placed to the rear of the worker, the cotton taken up by the latter is carried over and returned to the main cylinder at a point behind that from which it is taken off, so that the same fibers, even after they may have been sufficiently carded and opened, are again and again submitted to the action of the same worker, whereby the staple is injured by repeated working and the capabilities of the machine materially lessened.

When the stripper is placed in advance of its worker, the cotton is passed directly through the machine without being carried back to be again operated upon by the workers, whereby the machine is rendered capable of an increased amount of work, and the fiber is not injured by needless carding.

To enable others skilled in the art to understand my invention, I will proceed to describe the manner in which I have carried it out.

In the accompanying drawings the first part of my invention is represented as carried out with two strippers running at variable speeds, as will now be more particularly described.

A is the main cylinder; B and C, two small cylinders, which are driven with a surface velocity somewhat less than that of the main cylinder by the band D from a pulley, E, upon the shaft of the main cylinder. Upon the opposite end of the machine these cylinders carry the cones F and G, the band H which actuates them, being regularly traversed from one end of the cones to the other by the guide I, which is pivoted at *x*, and is moved in one direction by a cam, K, upon the shaft of one of the small cylinders, and in the opposite direction by the spring *y*, or in any other customary and suitable manner. The peculiar method by which this is effected forms no part of my present invention, and need not be further described.

It is evident that as the band H is shifted upon the cones one or other of the cylinders B and C will run faster than is due to the motion of the driving-band D, and that some device is necessary to enable the cylinders to run independent of their pulleys M and N whenever their motion is accelerated. This is effected in the following manner: The pulleys M and N are connected with the shafts of the cylinders by means of clutches so arranged that whenever the cylinders are driven by their pulleys M and N these pulleys are clutched with the shafts; but whenever the cylinders run faster than is due to the motion of the band D their shafts revolve freely within the pulleys. The device which I have chosen for this purpose is represented in Fig. 3, in which N is the pulley, $A^2$ the shaft of the stripping-cylinder, *m* a pad or block which is secured to the shaft $A^2$ by the bent spring *n*, which passes through a bolt or catch, *o*. The spring *n* revolves freely in the block *r*, projecting from the shaft. When the pulley revolves faster than the shaft, its friction upon the pad draws the bolt *o* through the shaft and into one of the notches, *s*, in the wheel, and thus the latter communicates its motion to the shaft. When, however, the latter revolves faster than it is driven by the wheel, the pad *m* is driven in the opposite direction, the bolt *o* is unlocked from the wheel, and the shaft revolves independently of the wheel. The cylinders B and C can never revolve with a velocity less than that due to the motion of the band D. Either of them may, however, revolve with a greater velocity, as before explained. Suppose the band H to be upon the large end of the cone G and the smaller end of the cone F, the cylinder C will then run with its minimum velocity, being driven by the band D, and the cylinder B will be driven at a more rapid rate by the band H, the shaft of this latter roll revolving freely in its pulley, which is still driven at a uniform rate by the band D, as before explained. The cylinder B now strips the main cylinder, taking off all, or very nearly all, the cotton from its surface. As the band H is traversed back toward the machine the velocity of the cylinder B diminishes and that of the cylinder C increases, and when the band has arrived at the small end of the cone G the cylinder B travels with its minimum, and C with its maximum, velocity. The cylinder B is now stripped by the main cylinder, which is itself stripped by the cylinder C.

The second part of my invention is also represented as carried out with two strippers, B and C, at variable speeds. The cylinder P is a doffer to the variable cylinder C. It runs uniformly at a rate slower than either the cylinder C or the main cylinder, and returns the cotton received from the former onto the main cylinder, by which it is stripped.

When the cylinder B runs at its maximum velocity, as heretofore described, it strips the main cylinder, and the cotton thus taken off by the cylinder B is carded onto the cylinder C, which now acts as a doffer to B, and as C now runs slower than the main cylinder it is stripped by the latter, and thus the main cylinder and the cylinder C are stripped.

When the cylinder C runs at its maximum velocity, it strips the main cylinder and is doffed by the cylinder P, which in its turn is stripped by the main cylinder. The cylinder B is now stripped by the main cylinder. Thus by the use of the doffer in connection with the variable cylinders all these cylinders are stripped and cleaned at short intervals of time without occasioning any break or unevenness in the sheet, and without the necessity of stopping the engine for the purpose.

It will thus be seen that a machine thus arranged with two variable cylinders and a doffer becomes a compound or double card, the stripping process being also a carding process. In all other methods of carding heretofore used the stripping process is an interruption of the carding process.

By the application of other variable cylinders in addition to those herein described the carding ability of the machine may be proportionately increased.

The third part of my invention will now be described.

Q is a worker, which is stripped by the cylinder R. This cylinder is placed in advance of the worker, and transfers the cotton which it takes from it to the main cylinder at a point in advance of that from which it was taken off, so that it is passed directly through the machine, and in no case is the material twice operated upon by the same worker.

O is a worker, occupying a similar position with respect to its stripper B, as will be seen by reference to the drawings. At S is represented a worker having its stripper R behind it in the ordinary manner, the cotton taken off by the stripper being returned to the main cylinder at a point back of that from which it was taken off.

It is evident when the cylinders are thus arranged that the fibers are liable to be repeatedly taken up and carried back by the same worker, as before explained, which objection is entirely removed by placing the stripper in advance of the worker. By placing the stripper R between the two workers Q and S the advantages of my system are measurably gained, while the space occupied by one stripper is saved.

T is the main doffer, from which the cotton is taken in the ordinary way by the comb V.

What I claim as my invention, and desire to secure by Letters Patent, is—

1. The application to carding-engines of two or more variable cylinders arranged and operated in the manner substantially as herein set forth, for the purpose of preventing the filling up of the main cylinder.

2. The use of a doffer in combination with strippers or cleaners arranged and operating in the manner substantially as herein described, for the purpose of preventing the filling up of the main cylinder and producing a uniform sheet.

A. D. SHATTUCK.

Witnesses:
J. H. SMITH,
L. M. SMITH.